United States Patent [19]
Lawrence, III et al.

[11] 3,813,149
[45] May 28, 1974

[54] PIVOTAL MOUNTING DEVICE FOR STADIUM SEATS AND THE LIKE

[75] Inventors: Edwin F. Lawrence, III, Sterling; Delmar D. McNinch, Rock Falls, both of Ill.

[73] Assignee: Lawrence Brothers, Inc., Sterling, Ill.

[22] Filed: Dec. 23, 1971

[21] Appl. No.: 211,587

[52] U.S. Cl. .............................................. 297/335
[51] Int. Cl. ......... A47c 1/02, A47c 1/06, A47c 1/12
[58] Field of Search ....... 297/13, 34, 316, 330, 332, 297/335, 337, 338; 287/87, 88, 21; 248/481, 484, 371

[56] References Cited
UNITED STATES PATENTS

| | | | |
|---|---|---|---|
| 622,314 | 4/1899 | Worthington | 248/371 M X |
| 1,189,321 | 7/1916 | Watkins | 297/313 M X |
| 1,198,461 | 9/1916 | Levin | 297/13 |
| 1,887,240 | 11/1932 | Hanson | 297/331 |
| 2,000,172 | 5/1955 | Hanson | 287/87 X |
| 2,547,124 | 4/1951 | Hudson et al. | 287/21 |
| 2,594,781 | 4/1952 | Magnussen | 287/21 X |
| 2,706,967 | 4/1955 | Iannetti | 287/21 UX |
| 2,879,091 | 3/1959 | Baker | 287/87 |
| 2,896,474 | 7/1959 | Rhodes | 287/87 X |
| 2,942,901 | 6/1960 | Booth | 287/21 A X |
| 3,052,130 | 9/1962 | Kellogg et al. | 287/87 |
| 3,183,901 | 5/1965 | Tnuesen | 287/87 X |
| 3,235,294 | 2/1966 | Naylor et al. | 287/21 |
| 3,287,060 | 11/1966 | Thompson | 297/332 |
| 3,347,593 | 10/1967 | Walkinshaw | 297/335 |
| 3,727,975 | 4/1973 | Anderson | 297/332 |

FOREIGN PATENTS OR APPLICATIONS

| | | | |
|---|---|---|---|
| 338,359 | 6/1959 | Switzerland | 287/78 |

*Primary Examiner*—Paul R. Gilliam
*Attorney, Agent, or Firm*—Olson, Trexler, Wolters, Bushnell & Fosse, Ltd.

[57] ABSTRACT

The present invention relates generally to improvements in pivotal mounting devices for stadium seats and the like and more particularly to novel and practical pivotal mounting arrangements which will assure maintenance of stadium seats and the like in an upright position and also enable a user conveniently to shift the seat from upright to its normal position for occupancy. The mounting device disclosed herein comprises a stub shaft, one extremity of which is peripherally splined for attachment to a fixed frame member, the opposite extremity being threaded to accommodate a clamping nut member. Interposed between the splined extremity and the clamping nut is a spherical bearing arrangement to compensate for variations in seat installations. Friction means encircling the stub shaft seals the mounting from moisture and assures maintenance of a seat member in upright position when not in use.

5 Claims, 4 Drawing Figures

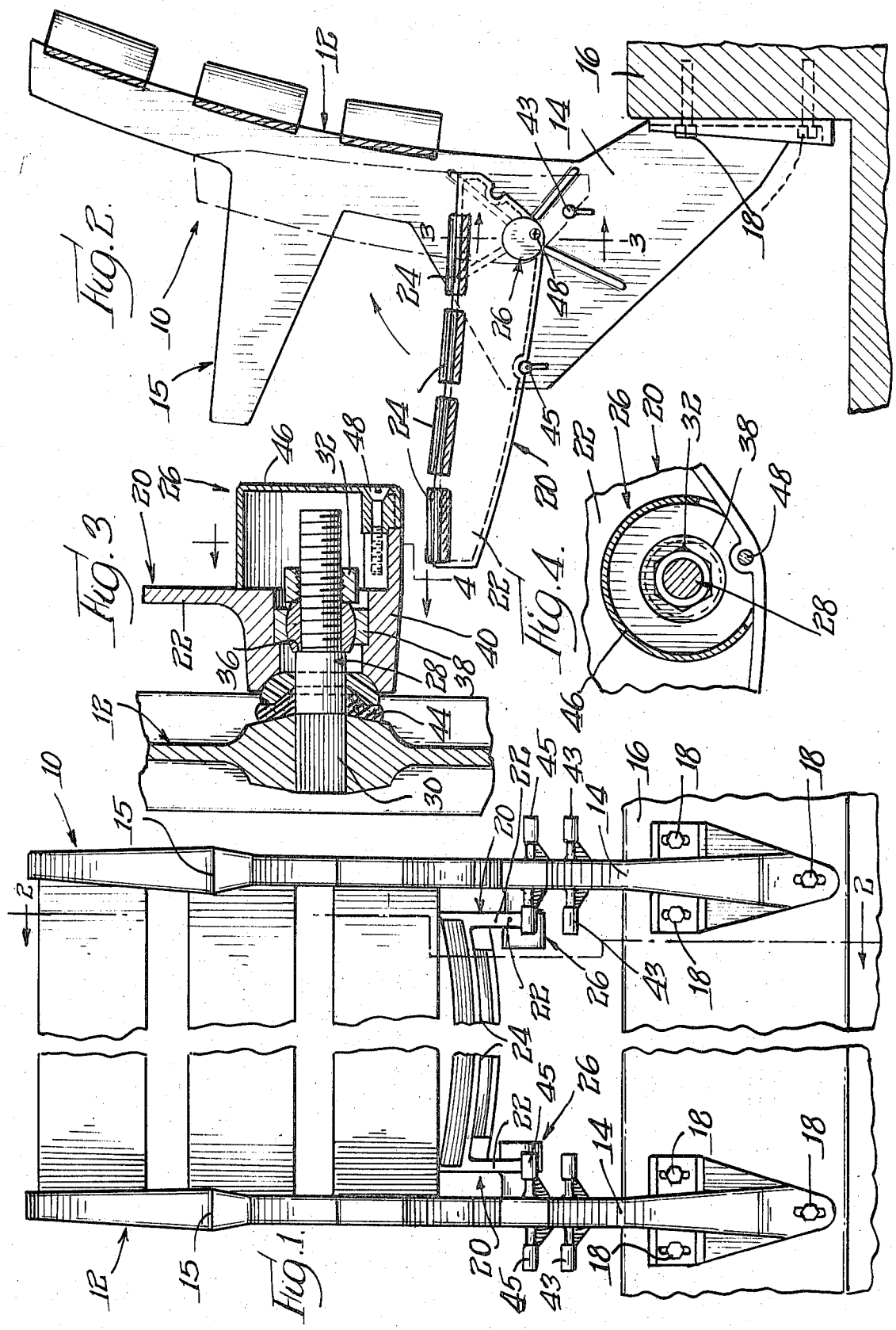

PIVOTAL MOUNTING DEVICE FOR STADIUM SEATS AND THE LIKE

SUMMARY OF THE INVENTION

It is common practice in the fabrication of stadium seats and the like to employ a series of transverse slats extending between a pair of frame members which may be tilted between horizontal and vertical positions. It is desirable, when the seats are not in use, to maintain said seats in a vertical position. It is also very important that pivotal mountings for such stadium seats be weather resistant in order to assure satisfactory functioning thereof over an extended period of time. It is therefore one of the important objects of the present invention to provide a pivotal mounting device for stadium seats and the like which is completely sealed against deterioration which might otherwise result from climatic conditions.

The present invention contemplates a pivotal mounting device of the type set forth above which avoids the necessity of employing metallic springs and the like which are normally subject to the corrosive effect of moisture.

During the installation of seat structures of the type contemplated hereby it is not uncommon to encounter some misalignment, and the present invention contemplates the provision of a pivotal mounting or support which will automatically adjust itself to accommodate such variations.

More specifically, the present invention envisions an improved, practical pivotal mounting wherein a pair of axially spaced stub shafts are mounted in a unique design substantially free from repair or adjustment over an extended period.

BRIEF DESCRIPTION OF THE DRAWINGS

The foregoing and other objects and advantages will be more apparent from the following detailed description when considered in connection with the accompanying drawing wherein:

FIG. 1 is a front elevational view of a seat structure equipped with pivotal mounting devices of the type contemplated by the present invention;

FIG. 2 is a vertical sectional view taken substantially along the line 2—2 of FIG. 1;

FIG. 3 is an enlarged detail sectional view of the pivotal mounting device taken substantially along the line 3—3 of FIG. 2; and FIG. 4 is a fragmentary vertical sectional view taken substantially along the line 4—4 of FIG. 3.

DESCRIPTION OF A PREFERRED EMBODIMENT

Referring now to the drawing more in detail, wherein like numerals have been employed to designate similar parts throughout the various figures, numeral 10 indicates generally a stadium seat structure for which the present invention is particularly adaptable. The seat structure 10 incorporates two upright or back sections 12 having lower portions or stanchions 14 secured in a fixed position to a concrete block or step 16 by suitable bolts 18. Arms 15 are formed integral with and extend forwardly from the frame sections 12. Pivotally supported by and extending between the upright frame sections 12 is a seat section designated generally by the numeral 20. This seat section 20 includes side frame members 22, the upper margins of which support a plurality of transverse seat members or slats 24.

The present invention is concerned primarily with the manner in which the side frame members 22 are pivotally mounted upon the fixed frame members 12. In FIGS. 1 and 2 the horizontal position of the seat section 20 is disclosed by solid lines, whereas in FIG. 2 the upright position of the side frame members 22 is designated by dot-and-dash lines. The pivotal mounting device forming the subject matter of the present invention is indicated generally by the numeral 26, best illustrated in FIGS. 3 and 4. Each of the pivotal mounting devices 26 includes a stub shaft 28, one extremity of which is provided with a plurality of longitudinal splines or knurlings 30 having a forced frictional fit within an enlarged portion of the fixed frame member or section 12. The opposite extremity of the stub shaft 30 is threaded to accommodate a clamp nut 32. The nut 32 is adapted to engage one extremity of a spherical bearing member 34, the opposite extremity of which bears against a shoulder 36 on the stub shaft 28. The spherical bearing member 34 is preferably of the scintered bronze type and supports a complementary internally spherical race member 38 which is affixed to and movable as a unit with one of the seat sections 22.

A boss portion 40 of each seat frame member or section 22 is annularly concave at its outer extremity to accommodate and bear against a correspondingly shaped surface of a suitable plastic washer member 42. Interposed between an enlarged portion of the fixed frame section 12 and the plastic washer 42 is a yieldable, rubber-like washer member 44. It will be noted that the side of the race member 38 which faces the plastic or nylon washer member 42 bears against a shoulder formed in the boss 40 and tightening the nut 32 to the position shown in FIG. 3 will cause sufficient compression of the rubber-like washer 44 to set up frictional resistance to forces tending to tilt the seat section 20. Thus, when the seat section 20 is not in use and is shifted to the dot-and-dash line position shown in FIG. 2, it will remain in that position until force is exerted manually to shift it to the horizontal solid-line position. It will be noted that lugs 43 serve to limit the extent of upward tilting, and an abutment 45 limits the extent of downward pivoting of the seat section. To further protect the portion of the pivotal mounting in the vicinity of the threaded extremity of the stub shaft 28, a cap 46 is provided which is held in place by a suitable fastener such as a screw member 48 and the like.

From the foregoing it will be apparent that the present invention contemplates the provision of a very unique and practical pivotal mounting for stadium seats and the like. The rubber-like washer coupled with the concavo-convex plastic or nylon washer member provides a sealed bearing structure which establishes the required amount of friction to impositively resist unintentional tilting or shifting of the seat structure. Also, the spherical bearing arrangement assures proper functioning of the tiltable seat structure despite slight misalignments which may develop during initial installation. The covering cap at the threaded extremity of the stub shaft cooperates with the above mentioned washer elements at the opposite extremity thereof in protecting the pivotal mounting against corrosiveness and the obstructive accumulation of foreign matter. As previously stated, it has been found practical to employ scintered bronze spherical bearing members and the self-lubricating characteristics of the nylon washer member enhances the satisfactory functioning of the tiltable seat structure.

What is claimed is:

1. A pivotable mounting device for tiltable stadium seats and the like, including a first bearing means for providing a rotatable journal for a tiltable seat section relative to a stationary upright seat section, and second bearing means for establishing frictional contact with said tiltable seat section which contact will be sufficient to maintain said seat section in the upright position; said mounting device comprising: a shaft member having mounting means on one end thereof for connection in a substantially horizontal, fixed position to a stationary upright seat section, and said shaft having said first and said second bearing means carried thereon, said first bearing means comprising a bearing member carried by said shaft, a race member mounted about said bearing member and having an inner surface complemental to the outer surface of said bearing member and being freely rotatable relative thereto, said race member being adapted for mounting to a tiltable seat section for movement therewith, and said second bearing means comprising a plastic washer member carried on said shaft intermediate said first bearing means and said means for mounting said shaft to said stationary seat section, said plastic washer having a bearing surface thereon which is engageable against a corresponding bearing surface on a tiltable seat section, and a yieldable elastomeric washer member interposed between said shaft mounting means and said plastic washer for compression between said plastic washer and an adjacent surface on said stationary seat section, with said elastomeric washer, when compressed, adapted to force said plastic washer into engagement with the corresponding bearing surface on said tiltable seat section to establish the necessary frictional contact; and means on the opposite ends of said shaft for maintaining said first and second bearing means in position thereon.

2. A mounting device as defined in claim 1 wherein said bearing member of said first bearing means includes a spherical, outer surface and said inner surface of said race member is of a complemental, spherical configuration.

3. In combination: a stadium seat structure comprising an upright seat section, a tiltable seat section, and a pivotable mounting device joining said tiltable seat section to said upright section; said mounting device including a first bearing means for providing a rotatable journal for said tiltable seat section relative to said upright section, and second bearing means for establishing frictional contact with said tiltable seat section which contact will be sufficient to maintain said seat section in the upright position; said mounting device comprising: a shaft member having mounting means on one end thereof for connection in a substantially horizontal, fixed position to said stationary seat section, and said shaft having said first and said second bearing means carried thereon, said first bearing means comprising a bearing member carried by said shaft, a race member mounted about said bearing member and having an inner surface complemental to the outer surface of said bearing member and being freely rotatable relative thereto, said race member being mounted to said tiltable seat section for movement therewith, and said second bearing means comprising a plastic washer member carried on said shaft intermediate said first bearing means and said means mounting said shaft to said stationary seat section, said plastic washer having a bearing surface thereon which is engaged against a corresponding bearing surface on said tiltable seat section, and a yieldable elastomeric washer member interposed between said shaft mounting means and said plastic washer for compression between said plastic washer and an adjacent surface on said stationary seat frame, with said elastomeric washer forcing said plastic washer into engagement with the corresponding bearing surface on said tiltable seat section to establish the necessary frictional contact; and means on the opposite ends of said shaft maintaining said first and second bearing means in position thereon.

4. The combination as defined in claim 3, wherein the bearing surfaces on said plastic washer and said tiltable seat section are provided by mutually cooperating concave and convex surfaces.

5. The combination as defined in claim 3, wherein said bearing member of said first bearing means includes a spherical outer surface and said inner surface of said race member is of a complemental, spherical configuration.

* * * * *